United States Patent [19]
Feil et al.

[11] Patent Number: 4,588,546
[45] Date of Patent: May 13, 1986

[54] WIRE COATING PROCESS

[75] Inventors: Joseph N. Feil, Akron; John E. Hrivnak, Clinton, both of Ohio

[73] Assignee: The Goodyear Tire & Rubber Company, Akron, Ohio

[21] Appl. No.: 644,187

[22] Filed: Aug. 27, 1984

[51] Int. Cl.$^4$ ............................................. B29C 47/02
[52] U.S. Cl. ...................... 264/510; 156/52; 156/244.12; 156/244.23; 264/566; 264/568; 264/174; 264/DIG. 65; 427/117; 427/120
[58] Field of Search ............... 264/174, DIG. 65, 511, 264/566, 568, 510; 425/113, 114; 427/120, 117; 428/379; 156/244.11, 244.13, 52, 244.12, 244.23

[56] References Cited

U.S. PATENT DOCUMENTS

| | | | |
|---|---|---|---|
| 3,829,545 | 8/1974 | Van Vlaenderen | 264/174 |
| 4,145,474 | 3/1979 | Kertscher et al. | 264/174 |
| 4,206,011 | 6/1980 | Kanotz et al. | 156/244.13 |
| 4,391,848 | 7/1983 | Hilker | 427/120 |
| 4,394,417 | 7/1983 | Hilker | 428/379 |
| 4,406,851 | 9/1983 | Janssen et al. | 264/174 |
| 4,451,306 | 5/1984 | Verne | 156/244.11 |
| 4,469,718 | 9/1984 | Shirahata et al. | 428/379 |
| 4,489,130 | 12/1984 | Hilker | 428/379 |

FOREIGN PATENT DOCUMENTS

| | | | |
|---|---|---|---|
| 2110934 | 6/1973 | Fed. Rep. of Germany | 264/174 |
| 58-100318 | 6/1983 | Japan | 264/174 |
| 1599106 | 9/1981 | United Kingdom | 264/174 |

*Primary Examiner*—Jeffery Thurlow
*Attorney, Agent, or Firm*—Alvin T. Rockhill

[57] ABSTRACT

Wire which has been coated with a polymeric material is useful in a wide variety of applications. One such application is as a winding for electrical equipment such as motors, transformers, magnetic coils, relays and the like. Generally, coated wires of this type have been prepared by coating the wire with multiple layers of a solution of the coating material. It has been determined that metal wires can be satisfactorily coated with a specific type of thermoplastic composition in a single layer without using solvents. This process utilizes a tubing type cross-head die with the thermoplastic composition comprising a mixture of 80% to 99% by weight polyethylene terephthalate and from 1% to 20% by weight of polyethylene, polypropylene, or a mixture thereof.

18 Claims, 3 Drawing Figures

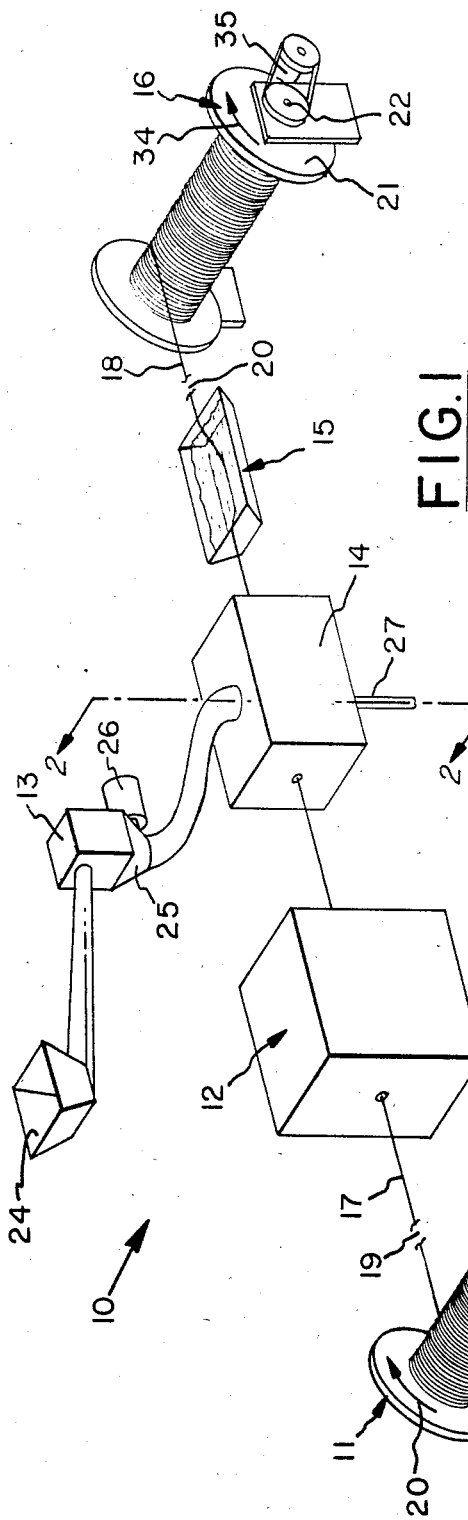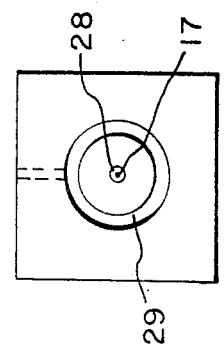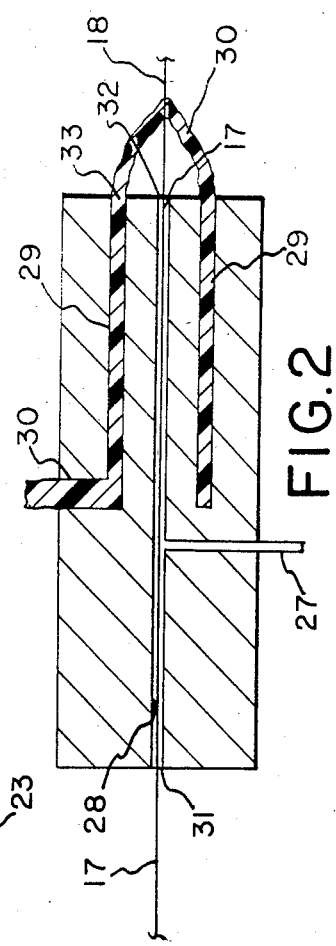

WIRE COATING PROCESS

BACKGROUND OF THE INVENTION

Coated metal wires are used for numerous purposes, such as general purpose electrical wire, magnetic wire, building wire, cables, lead or hook-up wire, and the like. One very important application for coated metal wires is as a winding for electrical equipment such as motors, transformers, magnetic coils, relays and the like.

Insulated electric wire for use in windings for electrical equipment (magnet wire) has been conventionally manufactured by passing a filament or strand of the bare metal wire through a bath of liquid enamel (a solution of resin material in a solvent therefor) and through an oven for driving off the solvent from the enamel and/or curing the resin, leaving a resin coat on the metal wire. This technique necessitates several successive passages of the wire through the liquid enamel bath of insulating material in order to obtain the required thickness of the coating (insulating layer). The application of several coats of the liquid enamel to the metal wire from solution accounts for almost all of the magnetic wire being manufactured today.

The equipment used in applying multiple layers of liquid enamel to wire is highly complex and expensive. In addition to this, the cost of the solvent expended in applying multiple layers of the resinous material from solution is usually very significant. The use of such solvents can also bring about certain environmental pollution and safety problems. In some cases the use of solvent based liquid enamels has necessitated the installation and maintenance of various types of pollution control equipment.

The use of extrusion coating in manufacturing coated wire is desirable because it eliminates the need for using a solvent. Applying coatings of resinous material by extrusion is substantially less common than applying coatings from solution and conventional extrusion processes are extremely limited. Coatings of four mils and less are either extremely difficult to apply or impossible to apply by conventional extrusion techniques. Also, the number of materials which are normally applied by conventional extrusion processes are extremely limited. Polyvinyl chloride, polyethylene, polypropylene and various elastomeric rubbers comprise almost all of the materials conventionally applied by extrusion techniques. These materials are not used in a true magnet wire application because they do not possess the requisite properties. For example, in an electrical winding the magnet wire is insulated to provide voltage, mechanical, and thermal protection between the turns on the coils. In contrast, these materials are conventionally used in lead wire or hook-up wire applications which must protect against the full input line voltage of an electrical device. Consequently, extrusion is used only in the conventional production of cables, building wire, and lead or hook-up wire.

Conventional extruding equipment for coating wires is not without problems. Conventional extruders include a centering die, a material reservoir and a sizing die. The centering die mechanically centers the wire in the sizing die, the sizing die determines the exterior dimensions of the coated wire filament. The primary problem associated with extrusion apparatus is the wear on the centering die. Since the centering die is used to center the wire filament within the sizing die, the centering die must be finely adjusted to achieve a concentric coating and must be replaced periodically due to the wear resulting from the contact between the wire filament and the die. Centering dies are generally made of hardened steel; but because of the high amount of wear that occurs, diamond centering dies have been considered, but are not widely accepted.

The development of an improved method for manufacturing magnet wire having all of the benefits of an extrusion process and none of its disadvantages would be highly desirable. Such a method would lower the cost of the machinery required to manufacture such wire and would eliminate the need for solvent, lower manufacturing costs, conserve raw materials and energy, eliminate the need for any pollution control apparatus, require less expensive and simpler machinery than is now conventional, and allow for the continuous processing of the wire from the stage at which it is drawn to final shipment at relatively high speeds.

The process of coating metal wires with thermoplastic resins by extrusion is not new. For example, U.S. Pat. No. 4,165,957 discloses an apparatus for coating wire with very high melting-point thermoplastics in an extrusion process. The apparatus disclosed therein includes what is essentially a "pressure" cross-head die. U.S. Pat. No. 4,145,474 describes a general process wherein thermoplastic polycondensates are extruded onto and around metal wires. This patent indicates that the thermoplastic polycondensates which can be utilized include (1) linear polyesters of high molecular weight, such as polyethylene terephthalate, polybutylene terephthalate, and polyethylene naphthoate; (2) polyarylesters; (3) linear aliphatic polyamides having high molecular weight; (4) aramides; and (5) sulfur polymers, such as polyphenylene sulfide. U.S. Pat. No. 4,391,848 also describes a process for coating magnet wire with "flowable materials" such as nylon, polyethylene terephthalate, polyethylene, polycarbonates, polysulfones, epoxys, and polyetheramides, which utilizes a specific type of coating die. This coating die has an entrance opening larger than its throat portion wherein its entrance opening and throat portion are interconnected by a converging interior wall to define a die cavity. This die cavity is at least partially filled with the flowable material when this process is used for coating magnet wire.

SUMMARY OF THE INVENTION

This invention discloses a process for coating a wire with a thermoplastic composition to a desired thickness in a single pass comprising: (1) preheating the wire to a temperature of about 150° C. to about 325° C., (2) passing the wire through a tubing type cross-head die which is at a temperature of about 255° C. to about 350° C., (3) extruding the thermoplastic composition into a tube which surrounds the wire which is exiting the tubing type cross-head die at a speed lower than that at which the wire is exiting the tubing type cross-head die, and (4) applying a vacuum to the die cavity so as to cause the tube of thermoplastic composition to collapse onto the wire as it exits the tubing type cross-head die, wherein the thermoplastic composition is comprised of from about 80 weight percent to about 99 weight percent polyethylene terephthalate and from about 1 weight percent to about 20 weight percent of at least one member selected from the group consisting of polyethylene and polypropylene. By practicing this process coated wire can be produced which has a very desirable combination of properties. More specifically, the coated wire produced is highly resistant to cracking and crazing. In addition to this wire can be produced which has the desired coating thickness for applications as magnet wire or coil wire.

The process of this invention can be used to coat a variety of types of metal wire including aluminum wire and copper wire. Wires coated utilizing this process have all of the requisite properties needed to be utilized commercially as magnet wire. More importantly this process represents a cost effective and simple approach for manufacturing magnet wire which eliminates many of the problems associated with making such wire by the techniques described in the prior art.

It is essential for the thermoplastic composition used in the practice of this process to be a blend of (1) polyethylene terephthalate and (2) polyethylene and/or polypropylene. Normally this thermoplastic composition will be comprised of from 80 weight percent to 99 weight percent polyethylene terephthalate and from 1 weight percent to 20 weight percent polyethylene and/or polypropylene. In order to produce magnet wire having the properties desired which is resistant to cracking and crazing it has also been determined that a tubing type cross-head die needs to be utilized in the coating procedure. It is also important for the wire being coated to be preheated to a temperature between 150° C. and 325° C. before it is coated with the thermoplastic composition. In accordance with this process the tubing type cross-head die is maintained at a temperature from about 255° C. to about 350° C. throughout the process.

This invention also reveals a method of manufacturing insulated electric wire which is designed to be used in the manufacture of windings for electrical equipment such as motors, magnetic coils, relays and the like required to operate under load conditions wherein the temperature is elevated above ambient temperature and sometimes up to a use temperature of about 150° C., comprising the steps of (1) heating a metal wire to a temperature of from about 150° C. up to about 325° C., and (2) extruding a polyethylene terephthalate blend comprised of about 80 weight percent to about 99 weight percent polyethylene terephthalate and from about 1 weight percent to about 20 weight percent of at least one member selected from the group consisting of polyethylene and polypropylene onto and around the metal wire with a tubing type cross-head die at a temperature of from about 255° C. to about 350° C.

DETAILED DESCRIPTION OF THE INVENTION

The bare wires or filaments which can be coated utilizing the process of this invention are generally made out of copper or aluminum due to their outstanding ability to conduct electricity. These bare wires are normally round in shape, but can also be of rectangular configuration. The process of this invention can generally be utilized for coating bare metal wires having a diameter between 0.1 and about 4.0 mm (millimeters) in diameter.

The thermoplastic composition used in the process of this invention for coating such bare wires is a polyethylene terephthalate (PET) blend. More specifically, this thermoplastic composition is comprised of from about 80 weight percent to about 99 weight percent PET and from about 1 weight percent to about 20 weight percent of at least one member selected from the group consisting of polyethylene and polypropylene. It is normally preferred for this PET blend to be comprised of from 95 weight percent to 98 weight percent PET and from 2 weight percent to 5 weight percent of at least one member selected from the group consisting of polyethylene and polypropylene. The most preferred thermoplastic compositions for use in the practice of this invention contain about 97 weight percent PET and about 3 weight percent of polyethylene and/or polypropylene.

The polyethylene terephthalate used in the preparation of such thermoplastic compositions is generally a homopolymer which is prepared in a polycondensation reaction. This polycondensation reaction is carried out between terephthalic acid or a diester thereof (such as dimethylterephthalate) and ethylene glycol. However, copolyesters containing minor amounts of other diacids and/or glycols can also be utilized. In most cases terephthalate acid or a diester thereof will represent at least about 90 weight percent of the total amount of acids employed in the preparation of the PET and ethylene glycol will represent at least about 90 weight percent of the total amount of glycols used in the preparation of the PET. Thus, small amounts of other acids, such as isophthalic acid, could be incorporated into the PET without substantially altering its properties for use in the PET blends of this invention. By the same token, small amounts of 1,4-butane diol can be substituted for a portion of the ethylene glycol used in the preparation of the PET. However, it is recommended that a polyethylene terephthalate homopolymer be utilized in the PET blends utilized in the practice of the process of this invention. Polyethylene terephthalate having an intrinsic viscosity ranging from 0.55 to 1.40 can be used. It is preferred for the PET to have an intrinsic viscosity of 0.9 to 1.1. The intrinsic viscosities herein referred to are measured at 30° C. in a 60/40 phenol/tetrachloroethane mixture or in a 50/50 trifluoroacetic acid/dichloromethane mixture. If the later mixture is used the results should be adjusted to give the same values as would be obtained by using the former solvent system. Cleartuf TM 1006 is an example of a PET homopolymer that can be utilized in the practice of this invention which is commercially available from the Goodyear Tire & Rubber Company. Cleartuf TM 1006 has an intrinsic viscosity of about 1.04.

The type of polyethylene or polypropylene utilized in making the thermoplastic composition for application to the bare wire as an insulating sheath is not critical. For example, the polyethylene used can be high density polyethylene, low density polyethylene, or linear low density polyethylene. It is generally preferred for polyethylene to be used in lieu of polypropylene and for the polyethylene used to be linear low density polyethylene.

If it is desired for the insulated wire being produced to be colored then colorants can be added to the thermoplastic composition. Numerous coloring agents and pigments which are satisfactory for this purpose are commercially available. It is preferable for the thermoplastic composition to contain one or more antioxidants. Numerous commercially available antioxidants are very satisfactory for this purpose and are generally utilized in an amount ranging from about 0.05 weight percent to about 0.5 weight percent of the total weight of the thermoplastic composition. Thermoplastic compositions containing about 0.1 weight percent of an antioxidant have been utilized in the process of this invention with excellent results. Hindered phenolic antioxidants have excellent properties for use in the thermoplastic compositions utilized in this process. For example, 1,3,5-trimethyl-2,4,6-tris-(3,5-ditert-butyl-4-hydroxybenzyl)benzene can be used as an antioxidant in such PET blends with excellent results.

The thermoplastic compositions of this invention are applied to the bare wire being coated utilizing a tubing type cross-head die. In order to improve the adhesion between the thermoplastic composition being applied and the bare wire the bare wire is generally preheated before it enters the tubing type cross-head die. The wire being coated is normally preheated to a temperature between about 150° C. and about 325° C. It is generally preferred for the bare metal wire to be preheated to a temperature from about 180° C. to about 235° C. with it being most preferred to preheat the wire being coated to a temperature from 200° C. to 210° C. It is important for this preheating of the metal wire to be done at a stage that will allow it to remain hot for the subsequent extrusion of the thermoplastic composition onto and around it.

A vacuum is generally applied to the die cavity in the tubing type cross-head die in order to cause the tube of thermoplastic composition being extruded from the die to uniformly contract onto the bare wire as it exits the tubing type cross-head die. The amount of vacuum or partial vacuum that needs to be applied to the die cavity in order to facilitate bringing the newly formed tube of extruded thermoplastic composition into proper contact with the wire will be determined by a number of factors, such as, the speed that the bare wire is exiting the tubing type cross-head die, the thickness of the coating being applied, the diameter of the wire, and the dimensions of the tubing type cross-head die. Those persons skilled in the art will be able to ascertain the amount of vacuum needed in their particular process.

The tubing type cross-head die is maintained at a temperature of 255° C. to 350° C. for the extrusion process of this invention. It is normally preferred for the tubing type cross-head die to be at a temperature from 275° C. to 310° C. and most preferred for it to be at a temperature from 285° C. to 290° C. for the extrusion process.

By utilizing the process of this invention bare metal wires can be coated at relatively high speeds. It will generally be desirable to coat wires at relatively high speeds due to economic considerations. Generally wire will be treated at a rate of from about 20 meters per minute up to about 500 meters per minute. Normally the wire being coated will travel through the tubing type cross-head die at a speed of from about 100 meters per minute up to about 400 meters per minute. The exact speed at which the wire can optimally be coated can be determined by persons skilled in the art using standard engineering practice and will depend on the nature and design of the equipment being used, the thickness and type of wire being coated, and the thickness of the coating being applied. It should be noted that the tube of thermoplastic composition being extruded from the tubing type cross-head die will be extruded at a speed that is less than that at which the bare metal wire is exiting the tubing type cross-head die.

The tubing type cross-head die can be designed to coat wires with the thermoplastic composition to any desired thickness. Normally wires which will be manufactured into magnet wires will be coated to a thickness between about 10 microns and about 100 microns. Normally standard magnet wires having a diameter of about 1 millimeter are coated to a thickness in the range of 15 microns to 35 microns. Magnet wires having reinforced insulation generally have a coating thickness of 30 microns to 50 microns. As a general rule, the coating thickness on a magnet wire will be less than about 5 percent of the diameter of the bare metal filament in the magnet wire. The requirements which must be met by such magnet wire are described in certain standard specifications. For example, according to the German Industrial Standards these requirements are set forth particularly in DIN Sheets 46435 and 46416. For instance, since magnet wires are often subjected to temperatures up to 150° C. it is important for them not to thermally break down at these use temperatures. The thermoplastic compositions of this invention meet this requirement.

BRIEF DESCRIPTION OF THE DRAWINGS

The above-mentioned and other features of this invention are more fully set forth in the following description of several embodiments of this invention, including a presently preferred embodiment, which are illustrated in the accompanying drawings, wherein:

FIG. 1 is a prospective, fragmentary and diagrammic view of the apparatus of the invention:

FIG. 2 is a cross-sectional view of the tubing type cross-head die taken along line 2—2 in FIG. 1; and FIG. 3 is an end view of the tubing type cross-head die of the invention which shows the end of the die at which the wire exits.

DESCRIPTION OF A SPECIFIC EMBODIMENT

An apparatus which can be used in conjunction with the process of the present invention will be described referring to the drawings and specifically to FIG. 1. The apparatus 10 generally consists of a filament payout device 11, a filament preheater 12, and extruder 13 equipped with a tubing type cross-head die 14, a quench bath 15, and a filament take-up device 16. As shown in FIG. 1, the bare wire filament 17 and the coated wire 18 are broken at points 19 and 20. At the bare wire filament break 19, when this apparatus is used to manufacture magnet wire, conventional wire drawing equipment can be installed. Thus, an oversized bare wire filament 17 can be reduced to the desired size by utilizing drawing equipment prior to coating the bare wire filament. The filament preheater 12 in a specific embodiment of the process of this invention can include an annealer whereby the affects of drawing the bare wire filament or stretching it can be eliminated. In other specific embodiments in which the apparatus 10 is being used to manufacture coated wire 18, additional coating devices and hardeners can be inserted at break point 20 so that successive coats of various coating materials can be applied to the previously coated wire in a continuous manner.

The filament pay-out device 11 includes a spool 21 on which the bare wire filament 17 is stored. The spool 21 is mounted on a spindle 22 of the pay-out device 11 so as to rotate freely in the direction of arrow 20. Operatively associated with the spool 21 is a brake 23 which restrains the rotation of spool 21 as the bare metal wire filament 17 is being pulled therefrom by the filament take-up device 16 so as to prevent entanglements. In accordance with the process of this invention, it is highly possible that in an apparatus used for the commercial manufacture of magnet wire where bare wire filaments are being rolled, drawn or otherwise reduced in size, the filament pay-out device 11 can be completely eliminated, since the remaining apparatus can be used to coat bare wire filament 17 continuously in a single pass as the bare wire filament is supplied from such a rolling and drawing device. The spool 21 in this instance can be replaced with one or more reels upon which bare wire filament is transported from the rolling and drawing operation to the filament preheater 12. In instances where the filament pay-out device 11 is eliminated and rolling and drawing equipment are substituted therefor, it is important for an annealer to be included at point 19 in order to eliminate the effects of working the bare wire filament during the rolling and drawing operations. In such an operation depending upon the temperature at which the bare wire filament 17 left the annealer it is possible to eliminate the need for the filament preheater 12. However, it is important for the bare wire filament to be preheated to a temperature within the range of about 150° C. to about 325° C. before the thermoplastic composition is extruded onto and around the bare wire. It is important for the bare wire filament to be within this temperature range at the time the thermoplastic composition is extruded onto it in order for there to be good adhesion between the metal of which the wire filament is comprised and the tube of thermoplastic composition being extruded. Preheating the bare wire filament is an important aspect of the process of this present invention. The filament preheater 12 is used solely to raise the temperature of the bare wire filament 17 prior to the application of the coating material (PET blend) by the tubing type cross-head die 14. In the specific embodiment of this invention illustrated in FIG. 1, the device used to preheat the bare wire filament is filament preheater 12. However, in other embodiments of the process of this invention an annealer could be used to preheat the bare wire filament. The filament preheater 12 can be designed so as to heat the bare wire filament by passing it over hot rollers. In another embodiment the filament preheater 12 can be designed to heat the bare wire filament by simply containing an electrical resistance coil preferably of tubular shape through which the bare wire filament travels before going to the tubing type cross-head die 14.

The extruder 13 will normally be equipped with a material reservoir 24 for storing the thermoplastic composition which will be used to coat the bare wire filament. It will also generally be equipped with a pump 25 for transporting the thermoplastic composition from material reservoir 24 into the tubing type cross-head die 14. Pump 25 will usually be driven by a pump motor 26. Vacuum can be applied to the die cavity through a vacuum line 27. If so desired a vacuum pump can be connected directly to the tubing type cross-head die 14.

The tubing type cross-head die 14 is more clearly illustrated in FIG. 2 and FIG. 3. The die cavity 28 through which the bare wire filament 17 travels extends throughout the entire length of the tubing type cross-head die. The thermoplastic composition 30 used to coat the bare wire filament 17 is pumped into the tube extrusion cavity 29. The bare wire filament enters into the die cavity 28 at the entrance opening 31 of the die cavity and exits the die at the exit opening 32. The thermoplastic composition 30 exits the tubing type cross-head die at the tubing exit opening 33. After the thermoplastic composition exits the tubing type cross-head die through the tubing exit opening 33 it collapses upon and around the bare metal wire coating it uniformly. The tube of thermoplastic composition is extruded in such a way that it surrounds the bare metal wire which is exiting the tubing type cross-head die and collapses upon it due to the vacuum being applied to the die cavity 28 through vacuum line 27. This collapsing of the extruded tube of the PET blend onto the wire filament 17 is also caused by the adhesion of the thermoplastic composition to the bare metal wire being extruded. Due to the fact that the bare metal wire is exiting the die at a higher speed then that at which the thermoplastic composition is exiting the die as a tube which surrounds the bare metal wire, the tube of thermoplastic composition is stretched and oriented as it is being applied to the wire.

In the embodiment of this invention illustrated in FIG. 1, the hot coated wire 18 which has left the tubing type cross-head die 14 is rapidly cooled in a quench bath 15. Such a quench bath is not an essential element of the apparatus. For example, the newly coated wire 18 could be allowed to cool simply by air cooling it for a sufficient length of time. However, since high speed is normally desirable a quench bath will normally be utilized. The quench bath will normally utilize a cooling fluid, such as water. The quench bath can optionally contain various conditioners or dyes as desired.

The take-up device 16, in many respects is similar to the pay-out device 11. The take-up device 16 comprises a reel 21 on which the coated wire 18 is spooled for shipment. Reel 21 can be a conventional spool on which the coated wire is shipped. Spools 21 are mounted for rotation on a spindle 22 so as to be driven in the direction of arrow 34. Operatively connected to the spool 21 is a motor 35 which drives the spool 21 and thereby pulls the bare wire filament 17 and coated wire 18 from the spool or reel 21 of the pay-out device 11 ultimately to the filament take-up device 16.

The following examples and comparative examples are presented in order to further illustrate the process of this invention and the benefits that it provides. These representative examples are merely for the purpose of illustration and are not to be regarded as limiting the scope of the invention or the manner in which it can be practiced. Unless specifically indicated otherwise, all parts and percentages are given by weight.

EXAMPLE 1

A magnet wire can be manufactured using the process of this invention. In doing so the thermoplastic composition can be prepared by mixing together PET and linear low density polyethylene so as to prepare a blend containing 97% PET and 3% linear low density polyethylene. To this blend 0.1 percent of Ethanox TM 330, which is 1,3,5-trimethyl-2,4,6-tris-(3,5-ditert-butyl-4-hydroxy benzyl)benzene, based upon the total weight of the PET blend is added. This PET blend can then be extruded onto a copper wire having a diameter of 1 millimeters to a coating thickness of about 25 microns utilizing an extruder equipped with a tubing type cross-head die. This extrusion process can be carried out with the copper wire traveling through the tubing type cross-head die at a speed of about 150 meters per minute. Before the wire enters the tubing type cross-head die it will be heated to a temperature of about 205° C. with the tubing type cross-head die being maintained at a temperature of about 288° C. The freshly coated wire exiting the tubing type cross-head die is then quenched in a water bath at ambient temperature and the magnet wire thus manufactured is collected on a filament take-up device.

The magnet wire manufactured by this process has excellent electrical and mechanical properties. This wire is highly resistant to cracking and crazing and is suitable for commercial sale.

COMPARATIVE EXAMPLE 1

The process utilized in Example 1 can be repeated utilizing PET as the thermoplastic composition. However, magnet wire produced utilizing pure PET as the thermoplastic composition will craze after manufacture and is therefore not totally satisfactory for commercial sale and use.

COMPARATIVE EXAMPLE 2

The process for manufacturing magnet wire explained in Example 1 can be repeated utilizing a pressure type cross-head die in place of the tubing type cross-head die utilized in Example 1. However, the magnet wire manufactured utilizing the pressure type cross-head die will crack after manufacture. Thus, magnet wire manufactured utilizing PET/polyethylene blends is still not satisfactory for commercial use and sale because its coating has a tendency to crack. This is especially true in winding applications.

While certain representative embodiments and details have been shown for the purpose of illustrating the invention, it will be apparent to those skilled in this art that various changes and modifications may be made therein without departing from the scope of the invention.

What is claimed is:

1. A process for coating a wire with a thermoplastic composition to a desired thickness in a single pass comprising:
   (1) preheating the wire to a temperature of about 150° C. to about 325° C.;
   (2) passing the wire through a tubing type cross-head die which is at a temperature of about 255° C. to about 350° C.;
   (3) extruding the thermoplastic composition into a tube which surrounds the wire which is exiting the tubing type cross-head die at a speed lower than that at which the wire is exiting the tubing type cross-head die; and
   (4) applying a vacuum to the die cavity so as to cause the tube of thermoplastic composition to collapse onto the wire as it exits the tubing type cross-head die; wherein the thermoplastic composition is comprised of 95 to 98 weight percent PET and from 2 to 5 weight percent of at least one member selected from the group consisting of polyethylene and polypropylene.

2. A method of manufacturing insulated electric wire which is designed to be used in the manufacture of windings for electrical equipment, comprising the steps of
   (1) heating a metal wire to a temperature of from about 150° C. to about 325° C.; and
   (2) extruding a polyethylene terephthalate blend comprised of about 95 weight percent to about 98 weight percent PET and from about 2 weight percent to about 5 weight percent of at least one member selected from the group consisting of polyethylene and polypropylene onto and around the metal wire with a tubing type cross-head die at a temperature of from about 255° C. to about 350° C.

3. A process as specified in claim 1, wherein said wire is preheated to a temperature from about 180° C. to about 235° C. and wherein said tubing type cross-head die is at a temperature of about 275° C. to about 310° C.

4. A method as specified in claim 2, wherein said wire is preheated to a temperature from about 180° C. to about 235° C. and wherein said tubing type cross-head die is at a temperature of about 275° C. to about 310° C.

5. A process as specified in claim 3, wherein said member selected from the group consisting of polyethylene and polypropylene is polyethylene.

6. A method as specified in claim 4, wherein said member selected from the group consisting of polyethylene and polypropylene is polyethylene.

7. A process as specified in claim 5, wherein said wire is coated with said thermoplastic composition to a thickness between about 10 microns and about 100 microns.

8. A method as specified in claim 6, wherein said polyethylene terephthalate blend is extruded onto said metal wire to a thickness between about 10 microns and about 100 microns.

9. A process as specified in claim 5, wherein said wire is coated with said thermoplastic composition to a thickness of less than about 5 percent of the diameter of said wire.

10. A method as specified in claim 6, wherein said polyethylene terephthalate blend is extruded onto said metal wire to a thickness of less than about 5 percent of the diameter of said wire.

11. A process as specified in claim 7, wherein said wire is a copper wire.

12. A method as specified in claim 8, wherein said metal wire is a copper wire.

13. A process as specified in claim 11, wherein said polyethylene is linear low density polyethylene.

14. A method as specified in claim 12, wherein said polyethylene is linear low density polyethylene.

15. A process as specified in claim 13, wherein said wire is preheated to a temperature from 200° C. to 210° C. and wherein said tubing type cross-head die is at a temperature of 285° C. to 290° C.

16. A method as specified in claim 14, wherein said wire is preheated to a temperature from 200° C. to 210° C. and wherein said tubing type cross-head die is at a temperature of 285° C. to 290° C.

17. A process as specified in claim 15 wherein said thermoplastic composition further comprises a hindered phenolic antioxidant.

18. A process as specified in claim 17, wherein said hindered phenolic antioxidant is 1,3,5-trimethyl-2,4,6-tris-(3,5-ditert-butyl-4-hydroxybenzyl)benzene.

* * * * *